(12) United States Patent
Uyeno et al.

(10) Patent No.: US 11,837,840 B2
(45) Date of Patent: Dec. 5, 2023

(54) MEMS MICRO-MIRROR ARRAY LASER BEAM STEERER FOR SIMULTANEOUS ILLUMINATION OF MULTIPLE TRACKED TARGETS

(71) Applicant: Raytheon Company, Waltham, MA (US)

(72) Inventors: Gerald P. Uyeno, Tucson, AZ (US); Sean D. Keller, Tucson, AZ (US); Benn H. Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 623 days.

(21) Appl. No.: 17/009,453

(22) Filed: Sep. 1, 2020

(65) Prior Publication Data

US 2022/0137395 A1    May 5, 2022

(51) Int. Cl.
*G01S 17/66*        (2006.01)
*G01S 17/86*        (2020.01)
(Continued)

(52) U.S. Cl.
CPC ........ *H01S 3/0071* (2013.01); *B23K 26/0643* (2013.01); *G01S 7/4814* (2013.01);
(Continued)

(58) Field of Classification Search
CPC .......................... G01S 17/66; G02B 26/0833
See application file for complete search history.

(56) References Cited

U.S. PATENT DOCUMENTS 5,404,375 A    4/1995   Kroeger et al.
5,854,702 A   12/1998   Ishikawa et al.
(Continued)

FOREIGN PATENT DOCUMENTS

DE    102011104023.8 B4    7/2019
EP         2667142 A1      11/2013
(Continued)

OTHER PUBLICATIONS

Screen captures from YouTube video clip entitled "MEMS Mirror Array—Beam Steering Mode," 2 pages, uploaded on Aug. 10, 2017 by user "Preciseley Microtechnology Corporation." Retrieved from Internet: <www.youtube.com/watch?v=wHIUU3kKtzM>. (Year: 2017).*

(Continued)

*Primary Examiner* — Yuqing Xiao
*Assistant Examiner* — Zhengqing Qi
(74) *Attorney, Agent, or Firm* — Schwegman Lundberg & Woessner, P.A.

(57) ABSTRACT

A multiple target tracker and beam steerer utilizes a MEMs MMA for beam steering to simultaneously illuminate multiple tracked targets per frame. The MMA can be adaptively segmented to change the number of output beams, and the power in a given beam, based on a list of tracked targets, range to targets, threat level etc. The MMA can be adaptively configured to simultaneously perform one or more Designation, Range Finding and Active Imaging modes on the same or different tracked targets. The MMA can be segmented so that each segment includes a plurality of mirrors to "oversample" the input beam. The mirrors in a given segment may be controlled to provide wavefront correction to the corresponding output beam.

18 Claims, 10 Drawing Sheets

(51) Int. Cl.
  *G02B 26/08* (2006.01)
  *H01S 3/00* (2006.01)
  *G01S 17/42* (2006.01)
  *G06T 7/20* (2017.01)
  *B23K 26/06* (2014.01)
  *G01S 7/481* (2006.01)
  *G01C 3/08* (2006.01)

(52) U.S. Cl.
  CPC .............. *G01S 17/42* (2013.01); *G01S 17/66* (2013.01); *G01S 17/86* (2020.01); *G06T 7/20* (2013.01); *G01C 3/08* (2013.01); *G02B 26/0833* (2013.01)

(56) References Cited

U.S. PATENT DOCUMENTS

| | | |
|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,526,352 B1 | 2/2003 | Johnson et al. |
| 6,567,574 B1 | 5/2003 | Ma et al. |
| 6,792,028 B2 | 9/2004 | Cook et al. |
| 6,816,315 B1 | 11/2004 | Ai et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,884,997 B2 | 2/2011 | Goodno |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,364,334 B2 | 1/2013 | Au et al. |
| 8,368,889 B2 | 2/2013 | Schwiegerling et al. |
| 8,380,025 B2 | 2/2013 | Anderson et al. |
| 8,400,619 B1 | 3/2013 | Bachrach et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 9,946,259 B2 | 4/2018 | Keller et al. |
| 10,062,175 B2 | 8/2018 | Uyeno et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,321,037 B2 | 6/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2010/0030473 A1 | 2/2010 | Au et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2012/0168605 A1* | 7/2012 | Milanovic ............ G01B 11/002 250/203.1 |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0011885 A1* | 1/2019 | Dürr ................... G03F 7/70291 |
| 2019/0066320 A1* | 2/2019 | Uyeno ..................... G06T 7/50 |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

"Mirrorcle Technologies MEMS Mirrors—Technical Overview" of Mirrorcle Technologes. Copyright dated 2017. Retrieved from the Internet: <URL: www.mirrorcletech.com/wp/wp-content/uploads/2018/01/Mirrorcle-Technologies-MEMS-Mirrors-Technical-Overview.pdf>. (Year: 2017).*

Ryf et al., "MEMS tip/tilt and piston mirror arrays as diffractive optical elements", Proc. SPIE 5894, Advanced Wavefront Control: Methods, Devices, and Applications III, 58940C (Aug. 30, 2005). (Year: 2005).*

Tsou et al., "Extended-image spatial tracking technique for deep-space optical downlinks", Proc. SPIE 3762, Adaptive Optics Systems and Technology, (Sep. 27, 1999). (Year: 1999).*

Tuantranont et al., "Optical beam steering using MEMS-controllable microlens array," Sensors and Actuators A: Physical vol. 91, Issue 3, Jul. 15, 2001, pp. 363-372. (Year: 2001).*

Rodriguez et al., "Beam steering by digital micro-mirror device for multi-beam and single-chip lidar," Proc. SPIE 10757, Optical Data Storage 2018: Industrial Optical Devices and Systems, 107570F (Sep. 14, 2018). (Year: 2018).*

"Mirrorcle Technologies MEMS Mirrors—Technical Overview", Mirrorcle Technologies, Inc., (2018), 7 pgs.

"U.S. Appl. No. 16/871,602, Non Final Office Action dated Nov. 9, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

(56) References Cited

OTHER PUBLICATIONS

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave- infrared-mwir-and-long-wave-infrared-lwir-waveplates/14317/>, (Accessed Sep. 4, 2021), 2 pgs.

Anderegg, Jesse, et al., "Coherently Coupled High Power Fiber Arrays", Proc. of SPIE 6102, Fiber Lasers III: Technology, Systems, and Applications 61020U, (2006), 6 pgs.

Augst, S J, et al., "Coherent and spectral beam combining fiber lasers", Proc. SPIE 8237, Fiber Lasers IX: Technology, Systems, and Applications, 823704, (Feb. 13, 2012), 11 pgs.

Ayral, J.- L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Fan, Ty, "Laser Beam Combining or High-Power, High-Radiance Sources", IEEE Journal of Selected Topics in Quantum Electronics, vol. 11, No. 3, (May/Jun. 2005), 567-577.

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 x 720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Redmond, Shawn, et al., "Active coherent beam combining of diode lasers", Optics Letters vol. 36, No. 6, (Mar. 15, 2011), 999-1001.

Salmon, J.T., et al., "An Adaptive Optics System for Solid-State Laser Systems used in (Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Siegman, A. E., "Unstable optical resonators for laser applications", Proceedings of the IEEE, vol. 53, Issue 3, (Mar. 1965), 277-287.

Wang, Jinxue, et al., "Doppler Winds Lidar Technology Development and Demonstration", AIAA-2005-6772, Space 2005, Long Beach, California, Aug. 30-31, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

"U.S. Appl. No. 17/007,917, Response filed Dec. 1, 2021 to Non Final Office Action dated Aug. 3, 2021", 16 pgs.

"U.S. Appl. No. 17/007,917, Notice of Allowance dated Jan. 10, 2022", 14 pgs.

"U.S. Appl. No. 17/007,917, Supplemental Notice of Allowability dated Apr. 19, 2022", 2 pgs.

\* cited by examiner

TILT/TIP

FOCUSING

AO PISTON

SEGMENTED TILT/TIP

MEMS MICRO-MIRROR ARRAY LASER BEAM STEERER FOR SIMULTANEOUS ILLUMINATION OF MULTIPLE TRACKED TARGETS

BACKGROUND OF THE INVENTION

Field of the Invention

This invention relates to target tracking and laser beam steering to illuminate the tracked targets for, designation, range finding or active imaging, and more particularly to simultaneous tracking and illumination of multiple targets per frame.

Description of the Related Art

Laser beam steering is used to perform functions such as Designation, Range Finding and Active Imaging. Typically, a laser is configured to transmit a laser beam, typically pulsed, along a fixed transmission path ("along boresight"). The laser may be steered manually in a hand-held unit or automatically on a gimbal mounted system to point boresight at the target.

Laser Designation transmits an encoded pulsed laser beam at a wavelength of 1,064 nm to designate a target. The pulsed laser beam has a pulse repetition frequency (PRF) in which a defined pattern of pulses forms a designation code. Laser Designation of targets is used during acquisition, tracking and terminal guidance of guided munitions with a sensor commonly known as a semi-active laser (SAL) sensor.

Laser range finders transmit laser beams at a remote target to determine the distance or range to the remote target. Laser range finders generally operate on the "time of flight" principle by measuring the time taken for a laser pulse to travel to the target and be reflected back to the range finder. With the speed of the laser light being a known value, and with an accurate measurement of the time taken for the laser light to travel to the target and back to the range finder, the range finder is able to calculate the distance from the range finder to the target. Other techniques such as continuous wave (CW) or frequency modulated (FM) modulated CW may be used to determine range. An "eye-safe" wavelength of 1,550 nm is typical although 1,064 nm or other wavelengths may be used as well.

Active imaging detects laser energy reflected by elements within a scene to form an image of the scene. The active image of a portion of the scene may augment a passive image of the entire scene. Active imaging provides a measurably higher signal-to-noise ratio (SNR) than passive imaging, which can be useful for target detection, acquisition, classification or aimpoint selection.

U.S. Pat. No. 8,400,619 entitled "Systems and methods for automatic target tracking and beam steering" employs an image capturing system for acquiring a series of images in real time of a distant area containing a remote target, and a processing system for processing the acquired images to identify the target and follow its position across the series of images. "The beam steering system may accomplish steering of the beam transmission axis by decentering or adjusting the position of one or more components of an optical system, . . . " (Col. 7, lines 6-14). This approach allows for small steering deviations off of boresight to designate a single tracked target. In lay terms, the operator points the weapon at the target, the image capture system determines a small correction to point the laser precisely at the target, the beam steering system mechanically moves the optical component to make the correction and once "locked", the operator pulls the trigger to transmit the laser beam towards the single target. This method simply corrects the aimpoint for a single target. Furthermore "If more than one target is within the steering zone 145, the automatic target tracking system will select one of the targets within the steering zone and will control the beam steering system so that the beam transmission axis is steered to and will follow the selected target within the steering zone." (col. 27, lines 12-34). The system tracks and illuminates one target at a time over many frames until a next target is engaged.

WO 2014/200581 entitled "Non-Mechanical Beam Steering Tracking System" discloses a solid-state laser beam steering apparatus 12 comprising a LCWG 14 and a coarse steering polarization grating (PG) 16 to steer a laser spot-beam. The former is ideal for compact, rapid continuous steering while the latter technology is most favorable for discrete steering to access large FORs. Within the limited FOV of a given PG, the LCWG can steer the laser beam quite rapidly. However, the coarse steering provided by switching the PGs is relatively quite slow. As disclosed in a paper by the same authors, the switching speed of the PGs is 2 ms (M. J. Escuti and W. M. Jones, "A Polarization-Independent Liquid Crystal Spatial-Light Modulator", *Proceedings of SPIE*, vol. 6332, no 63320M (2006)). As a result, the beam steering apparatus that combines the LCWG and PG stack can not steering quickly enough to illuminate multiple tracked targets per frame over at least the entire cue-box.

Another class of problems involves tracking and illuminating multiple targets within a field-of-view (FOV) about boresight. An image capture system generates a list of tracked targets and angles-to-targets at the frame rate of the imaging system. One approach is to mechanically steer a laser spot-beam to illuminate different targets. Mechanical steering has size, weight, power and cost (SWaP-C) limitations that limit its effectiveness, especially for small platforms. Speed constraints limit the ability to illuminate multiple targets per frame within a FOV. Another approach is to non-mechanically steer a laser spot beam using optical phased arrays in combination with polarization gratings. This approach has a lower SWaP-C than mechanical beam steering but has a limited ability to illuminate multiple targets within a FOV.

The current state-of-the-art is to use a video camera and tracking card to generate the list of tracked targets and corresponding angles-to-targets, flood illuminate the FOV and simultaneously detect the reflected laser energy off of all of the targets in the FOV with an imaging detector. Flood illumination provides an active image of all of the targets in the FOV. This image may be correlated to the tracked targets and processed to compute the range to each of the targets. The SWaP-C of the laser to flood illuminate a FOV and the complexity of the processing to extract the range information and correlate it to the tracked targets is burdensome.

U.S. Pat. No. 10,062,175 entitled "Multiple Target Tracker and Liquid Crystal Waveguide (LCWG) Beam Steerer for Designation, Range Find and Active Imaging" uses a LCWG to rapidly steer a laser beam to illuminate multiple tracked targets per frame one target at a time. Furthermore, a LCWG can only steer a very narrow band of wavelengths about a center wavelength. Each material system e.g., substrates, coatings and liquid crystals, and voltage settings to steer the laser beam are unique to each wavelength. Therefore to accommodate different wavelengths requires different LCWG devices and significant investment in materials, manufacturing, set-up and calibration etc. to design and field each device.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a multiple target tracker that utilizes a Micro-Electro-Mechanical System (MEMs) Micro-Mirror Array (MMA) for beam steering to simultaneously illuminate multiple tracked targets per frame.

In different embodiments, the MEMS MMA is adaptively segmented to change the number of output beams based on a list of tracked targets, range to targets, threat level of a given target etc. Adaptive segmentation can also be used to vary the power level of a given beam to prosecute a target based on similar factors.

In different embodiments, one or more modes selected from Designation, Range Finding (RF) and Active Imaging (AI) can be simultaneously performed on the same or different tracked targets. Designation and AI/RF are performed at different wavelengths. AI is performed with a CW or high-PRF laser whereas RF is performed with a low PRF laser. In some cases, RF/AI can be performed with the same laser source. The return signals off of the multiple targets are discriminated by wavelength and/or PRF.

In an embodiment for multi-mode operation, the MEMS MMA is partitioned into at least three sections, one each for Designation, Range Finding and Active Imaging. The mirrors in each section are provided with a reflective coating at the corresponding wavelength. In response to command signals, the MEMS MMA partitions each section into one or more segments to generate more output laser beams for the corresponding input source and mode of operation. The MEMS MMA can simultaneously prosecute multiple tracked targets using multiple modes of operation.

In an embodiment, the MEMS MMA is further partitioned into a fourth section for Multi-Spectral Active Imaging. The source generates a broadband beam and the fourth section is provided with a plurality of reflective coatings at different wavelengths. As such, the output beams are multi-spectral.

In different embodiments, each mirror is independently and continuously controllable to translate in a third axis orthogonal to the plane containing the first and second orthogonal axes to manipulate the wavefront of the output laser beam. In the case that a segment includes multiple mirrors to "oversample" the input beam, the mirrors may be control to perform wavefront correction e.g., adaptive optics (AO) for atmospheric distortion or focusing on the corresponding output beam.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a multiple target tracker and beam steerer that utilizes a MEMs MMA for beam steering to simultaneously illuminate multiple tracked targets per frame. The MMA can be adaptively segmented to change the number of output beams, and the power in a given beam, based on a list of tracked targets, range to targets, threat level etc. The MMA can be adaptively configured to simultaneously perform one or more Designation, Range Finding and Active Imaging modes on the same or different tracked targets. The MMA can be segmented so that each segment includes a plurality of mirrors to "oversample" the input beam. The mirrors in a given segment may be controlled to provide wavefront correction to the corresponding output beam.

The steering rate and range as well as steering capability afforded by the MEMS MMA supports various tracker configurations (out-of-band, in-band or dual-band video cameras), LADAR detectors (single pixel or focal plane array) and prioritization of tracked targets to vary the revisit rate (every Nth frame), dwell time (within a single frame) or beam power for an illuminated target. The MEMS MMA can be used to steer a pulsed beam at low or high pulse repetition frequencies (PRFs) or continuous wave (CW) beam. A user interface accepts commands from an operator to select a designation, range finding or active imaging mode, control cue-box size and position within the FOV and target selection. A fourth mode of operation may be multi-spectral active imaging.

Figure 1:
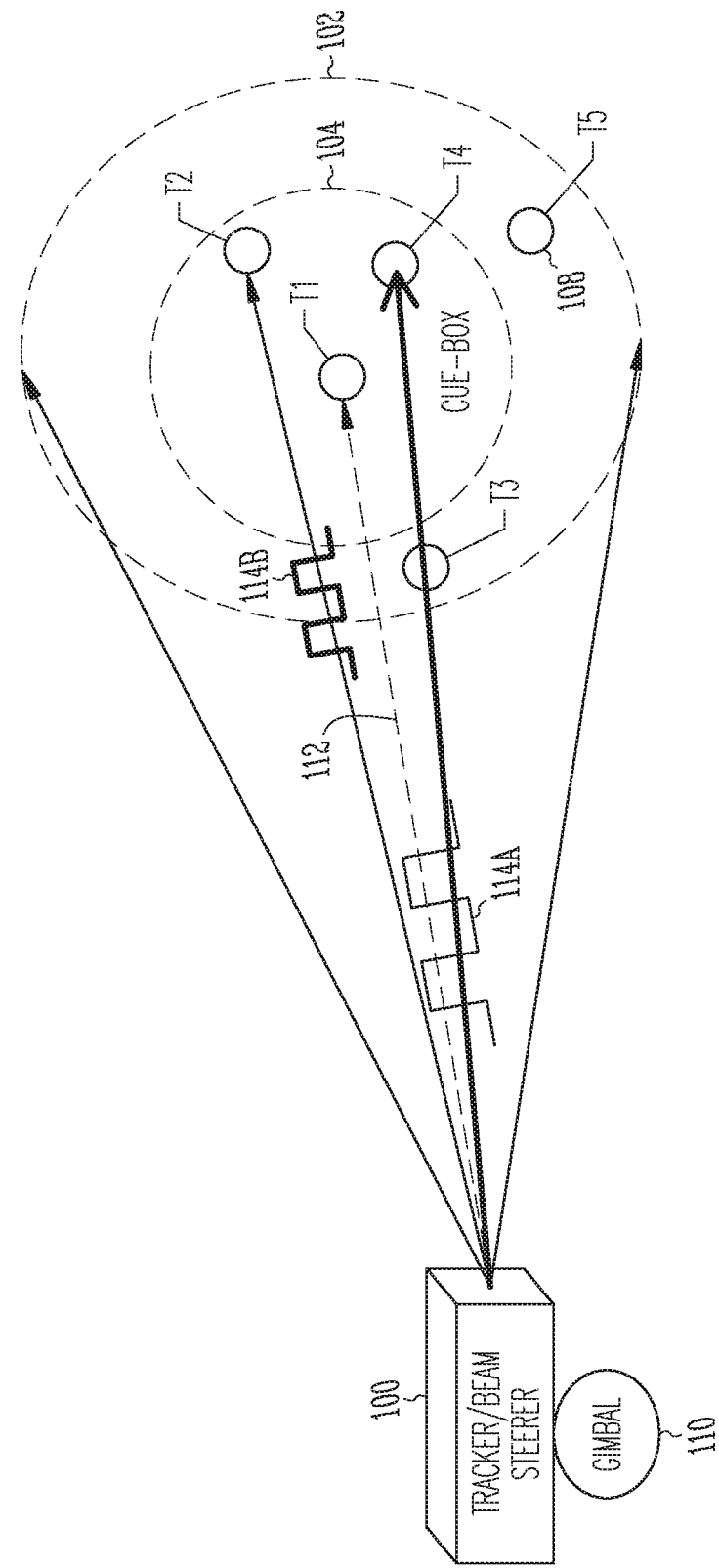
FIG. 1 is a diagram of a multiple target tracker and laser beam steerer configured to track and simultaneously illuminate multiple targets per frame within a FOV.
Figure 2A:
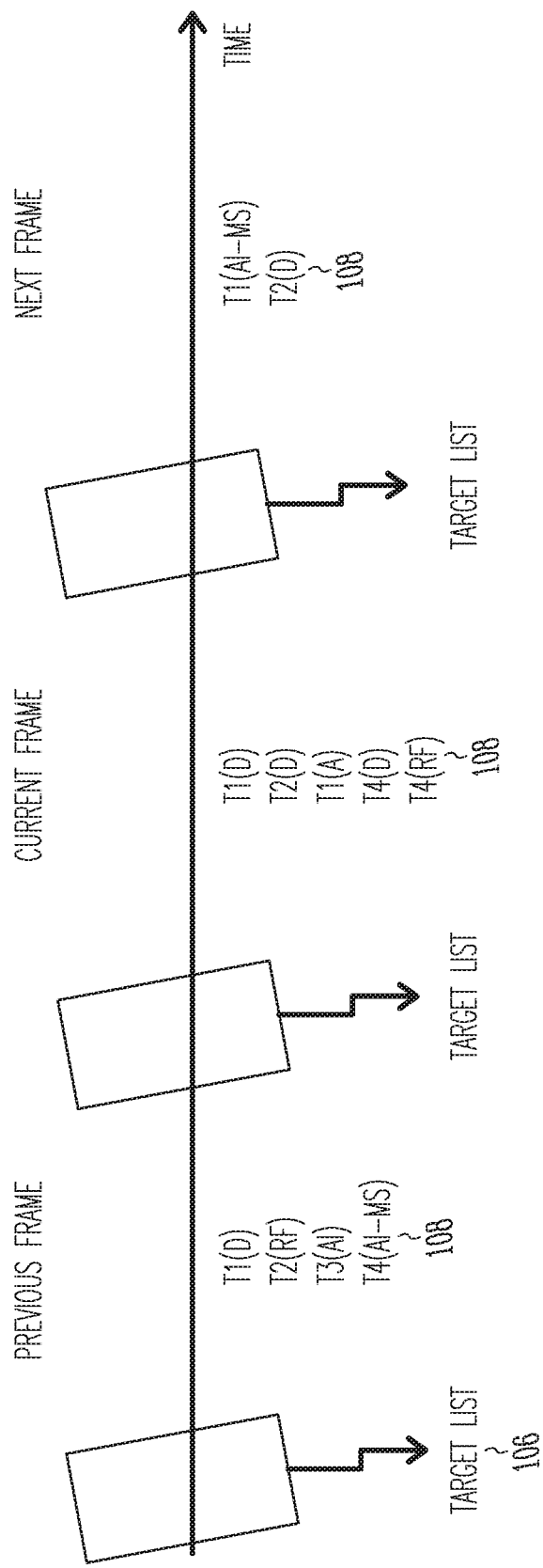
FIGS. 2A and 2B are timing diagram illustrating notional sequences for the tracking and simultaneous laser illumination of multiple targets in multi-modes of operation per frame.
Figure 2B:
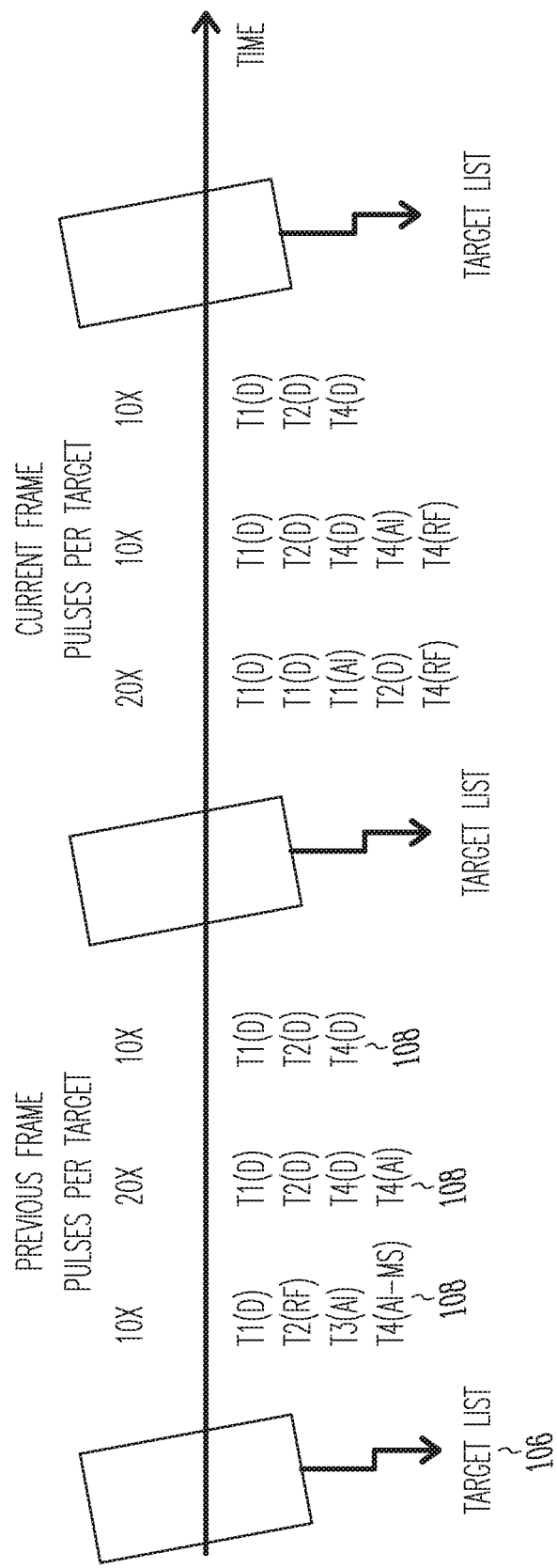

Referring now to FIGS. 1 and 2A-B, an embodiment of a multiple target tracker and beam steerer ("tracker/beam steerer") 100 for Designation, Range Finding or Active Imaging acquires video images of a scene within a FOV 102 at a frame rate (e.g., 30 Hz) that defines a frame time, processes the video images within at least a cue-box 104 (e.g., a circle or rectangle) within the FOV and outputs a target list 106 of tracked targets T1, T2, T3, . . . 108 and corresponding angles-to-targets within the frame time. The size of cue-box 104 is typically set as a percentage of the FOV 102. The tracker is typically limited to outputting a maximum number of "n" tracked targets on the list. The tracker/beam steerer 100 is suitably mounted on a mechanical gimbal 110 to point its boresight axis 112 in a particular direction e.g., at the center of cue-box 104 or at a selected one of the targets 108 within the cue-box. However, the mechanical gimbal 110 is not required for operation of the tracker/beam steerer system.

Tracker/beam steerer 100 produces laser spot-beam(s) 114*a*, 114*b*, . . . with a low or high PRF or CW, whose spectral band may or may not overlap the spectral band of the passively acquired video images. The tracker/beam steerer 100 processes the target list and corresponding angles-to-targets and generates command signals to steer the laser spot-beams 114*a*, 114*b*, . . . to the corresponding angles-to-targets for a given target set using, at least in part, MEMS MMA technology, to simultaneously illuminate multiple tracked targets at the same or different discrete wavelengths per frame. The MEMS MMA may illuminate multiple different target set within a given frame, changing the target composition, or mode(s) of each target set. The tracker/beam steerer 100 generates the command signals to set the revisit rate (e.g., every Nth frame) and dwell time (e.g., the number of pulses per target per frame) of each target based on target prioritization. The steering range, at least −10°×+10° in tip and tilt, and steering rate, at least 1 KHz (<1 millisecond), and steering control afforded by tip/tilt/piston MEMS MMA technology allows for multiple and sequential target tracking per frame over a wide FOV. A sufficient number of pulses can be placed on target to enable target designation, or to improve the accuracy of the range estimate or increase the SNR of the active image. With the MEMS MMA technology, multiple laser beams can simultaneously illuminate multiple tracked targets to simultaneously implement a combination of designation, range finding and active imaging modes on the same or different targets at the same or different discrete wavelengths.

The ability to steer the laser beam discretely, quickly and finely over a large steering range and to simultaneously generate and steer multiple laser beams greatly expands the trade-space for designing the tracker/beam steerer for designation, range finding or active imaging applications. The MEMS MMA can be adaptively "segmented" to change the number of beams, hence the power in a given beam based on the target list and tracking priorities (e.g. range to target, threat level, etc). For a given output laser beam, the minimum steering speed may be defined as the product of the required steering range, maximum number of targets, number of pulses per illuminated target and PRF, and the frame rate.

As illustrated in FIGS. 1 and 2A-2B, 5 targets T1, T2, T3, T4 and T5 are positioned in the FOV 102 of tracker/beam steerer 100. Tracker/beam steerer 100 tracks and outputs the list of tracked targets for any target that was acquired in the cue-box 104. Targets T1, T2 and T4 are currently positioned inside cue-box 104. Target T3 was acquired in the cue-box in a previous frame but has left the cue-box. Target T5 has not been acquired (e.g., sensed by the camera and corresponding target data entered into the video/beam steering processing functions).

As shown in FIG. 2A, the system generates a target set 108 from the target list and selected modes of operation for each frame. The target set may be the entire target list or a subset thereof and may include one or more of the modes of operation including Designation (D), Range Finding (RF), Active Imaging (AI) and Multi-Spectral Active Imaging (AI-MS). A typical MEMS MMA can in theory be segmented to generate a very large number of output laser beams, equal to the number of mirrors in the array, to address the various targets and operating modes. However, the system may choose to select a subset of the target list and modes based on other inputs such as the last range to target, threat level etc. to balance the total number of beams versus the power in a given beam. The MEMS MMA can be segmented into varying sizes to produce output laser beams with varying power levels depending in part on the range to target, threat level etc. The MEMS MMA provides a great deal of flexibility to adapt in real-time to address the multi-target threat.

As shown in FIG. 2B, the MEMS MMA further adapts the segmentation to change the target set 108 within a frame. For example, prioritization may determined such that tracked targets currently within the cue-box are revisited every frame and tracked targets outside the cue-box are revisited every Nth frame. In every Nth frame, the dwell time of a tracked target in the cue-box is set at a nominal value (e.g., 10 pulses) whereas the dwell time of a primary tracked target along boresight is set at a higher value (e.g., 15 pulses) and the dwell time of tracked target outside the cue-box is set at a lower value (e.g., 5 pulses). In the other N−1 frames, the pulses previously allocated to those tracked target outside the cue-box may be allocated to the primary target. This is example is merely illustrative of the capability afforded by MEMS MMA beam steering to prioritize the revisit rates and dwell times of tracked targets based on heading of the tracked target and position within the cue-box for modes when pulsed lasers are used. Time based multiplexing is possible for CW modes of operation.

Figure 3A:
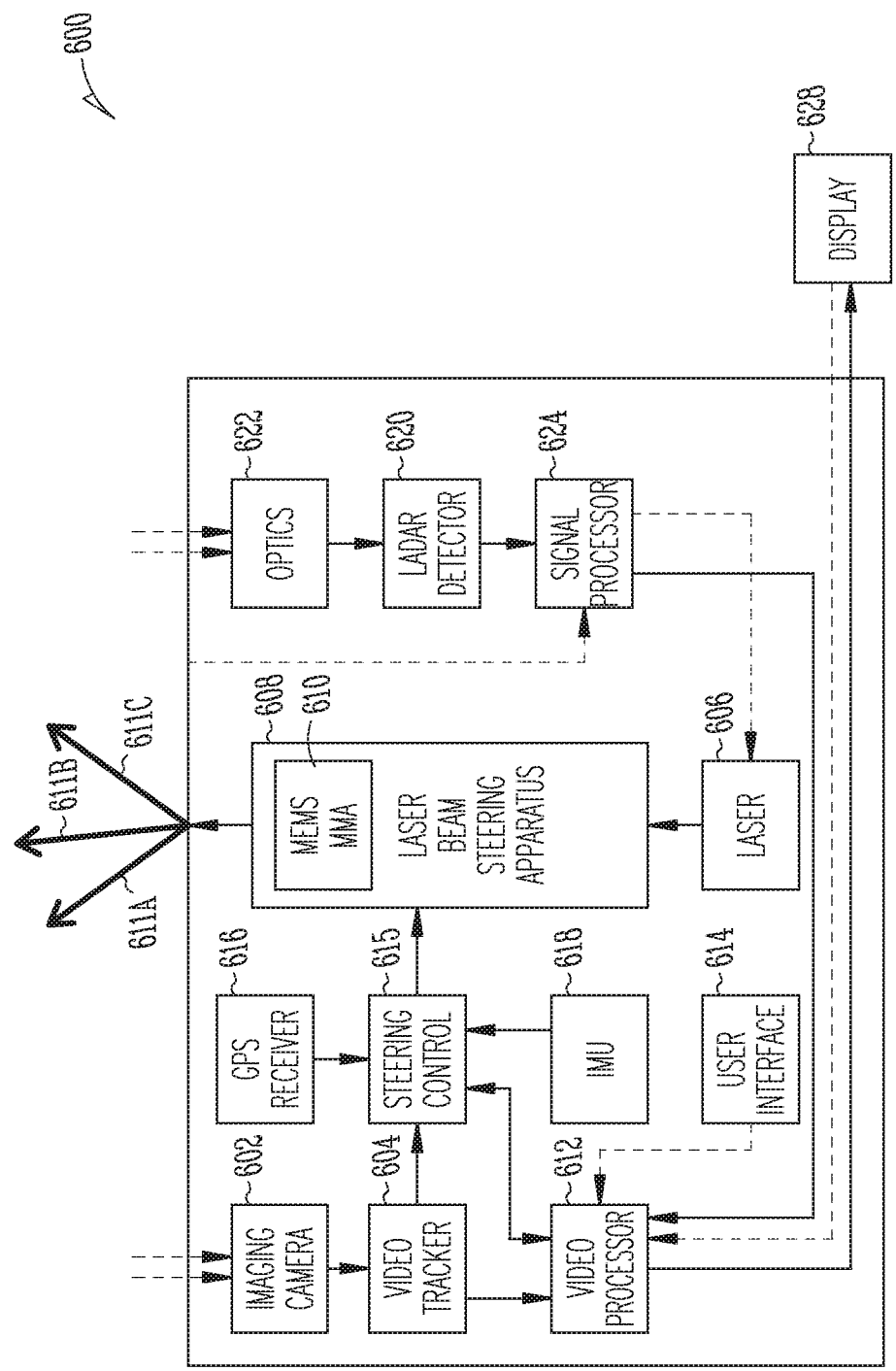
FIGS. 3A and 3B are block diagrams of an embodiment of the multiple target tracker and beam steerer using an out-of-band video camera for tracking and a tip/tilt/piston MEMs MMA for beam steering.
Figure 3B:
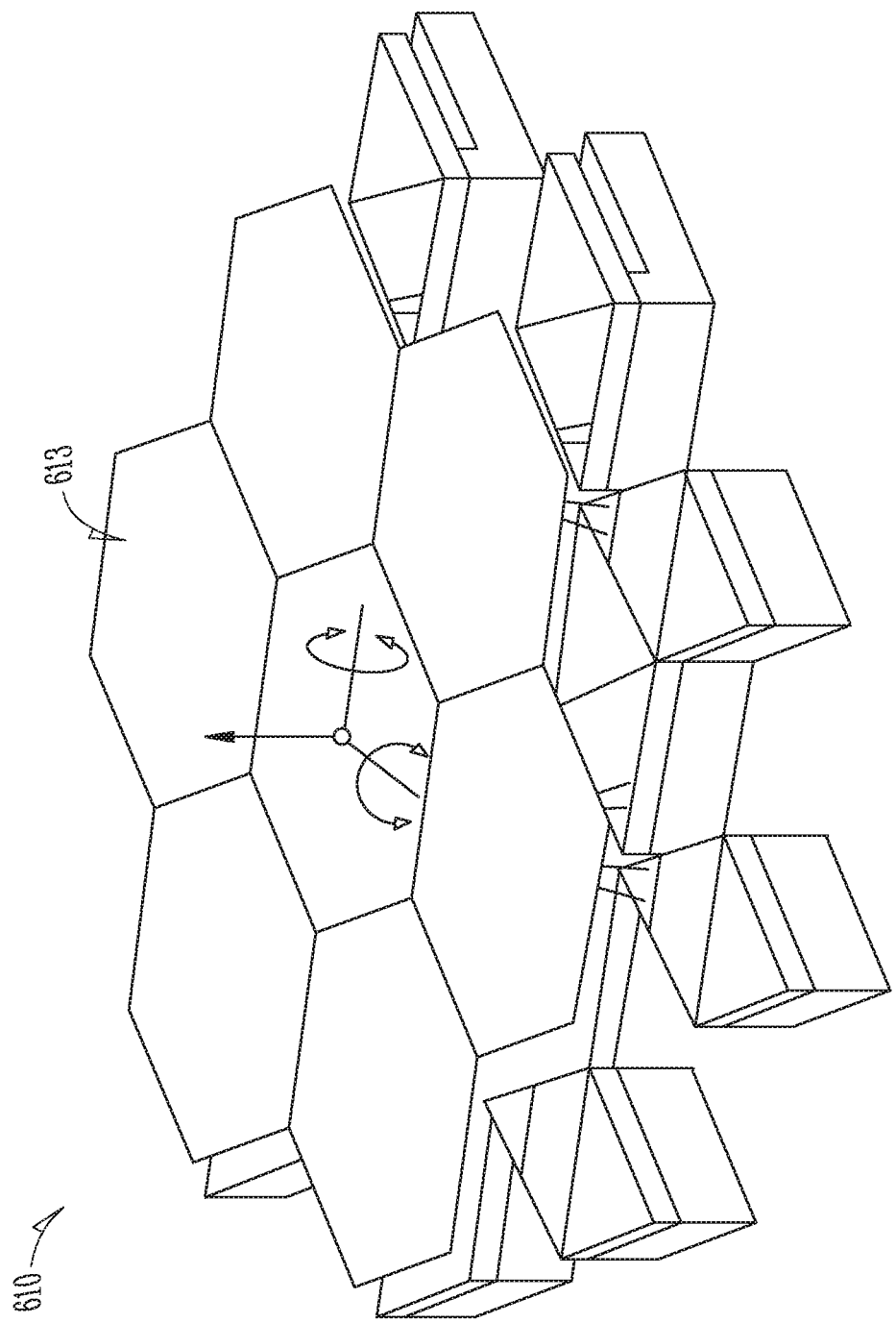

Referring now to FIGS. 3A and 3B, an embodiment of a tracker/beam steerer 600 uses a MEMS MMA 610 to track and simultaneously illuminate multiple targets to provide target Designation or Range Finding. Target tracker/beam steerer 600 comprises an imaging camera 602 configured to acquire video images of a scene within a FOV within a frame time and a video tracker 604 configured to process the video images and output a list of tracked targets and angles-to-targets within the frame time. A laser 606 is configured to produce an input pulsed laser spot-beam 607 at a CW or PRF in a different spectral band. A laser beam steering apparatus 608 including MEMS MMA 610 is responsive to voltage signals to simultaneously generate and discretely steer a plurality of output laser spot-beams 611*a*, 611*b* and 611*c* both in-plane and out-of-plane to the corresponding angles-to-target.

A video processor 612 is configured to process the list of tracked targets, inputs from a user interface 614 such as target selection, cue-box position and size, MEMS MMA steering rate and prioritization criteria and generate command signals for the MEMS MMA. Within a given frame time, the command signals dictate which tracked targets are simultaneously illuminated, for how long (e.g., number of pulses per illuminated target), at which discrete wavelengths, which mode(s) and at what beam power. From frame-to-frame, the command signals embody the revisit rate for the various targets. For laser Designation, the command signals embody the defined pattern of pulses to form the designation code. Video processor 612 may receive the same or similar information from a source external to the tracker/designator 600.

The command signals are provided to steering control 615 along with the list of tracked targets (and angles) from video tracker 604, position from a GPS receiver 616 and orientation from an IMU 618. Steering control 615 produces the voltage signals to drive MEMS MMA 610 to simultaneously illuminate the tracked targets with one or more pulses within the frame time.

A LADAR detector 620 is configured to sense reflected laser energy at a sampling rate sufficient to detect the one or more pulses that illuminate the tracked target. LADAR detector 620 may be a single-pixel detector or a pixelated detector. Depending upon the configuration of the system, the detector can be a single narrowband detector, multiple narrowband detectors or a single multi-spectral detector. A single-pixel detector has the advantages of low SWaP-C, reduced processing and lower noise. A pixelated detector has the advantages of simplified receiver design, larger FOV, and verification of the steered laser beam position for closed-loop control.

Optics 622 are configured such that detector 620 senses reflected laser energy over at least the entire cue-box and suitably the entire FOV of the video camera. Optics 622 may be shared with video camera 602, in which case a beam splitter is used to split the incident light into the respective spectral bands. Optics 622 may provide a zoom capability. For example, at great distances the FOV may be narrowed to increase the spatial resolution to facilitate target acquisition. As the range-to-target decreases, the FOV may be widened to facilitate multiple target tracking and designation.

A signal processor 624 processes the detector response to the reflected laser energy to determine range-to-target. The signal processor will typically operate on the "time of flight" principle by measuring the time taken for the laser beam to travel to the target and be reflected back to the range finder. The signal processor determines when the pulsed spot-beam is transmitted either by directly controlling laser 606 or by picking off a small amount of the laser output (<1%). With the speed of the laser light being a known value, and with an accurate measurement of the time taken for the laser light to travel to the target and back to the range finder, the range finder is able to calculate the distance from the range finder to the target. Other techniques such as CW or FM modulated CW may be used to determine range. Designation and AI/RF are performed at different wavelengths. AI is performed with a CW or high-PRF laser whereas RF is performed with a low PRF laser. The return signals off of the multiple targets are discriminated by wavelength and/or PRF. The signal processor sends the range-to-target to the video processor 612, which pairs it with the designated target, and sends a video signal to display 628.

Operating in the same band provides multiple possible advantages. First, the in-band video camera will simultaneously capture an image of both the target to be designated and the reflected laser energy (ideally the reflected laser energy is aligned with the target center). Second, since the reflected laser energy is "in-band" it is sensed by the video camera to form an active image of the illuminated target as part of the video image. Imagery obtained via active imaging with a laser will have a higher SNR than imagery passively obtained with the video camera. Signal processor is configured to send a timing signal to in-band video camera (or video tracker) to identify those images that contain reflected laser energy. Identifying frames that contain laser pulses enables the video tracker to maintain track on targets even with the higher SNR scene.

An embodiment of a "dual-band" tracker/beam steerer tracks targets in a pair of bands (e.g., SWIR and MWIR) and illuminates targets in in one of the two bands (e.g., SWIR). The dual-band tracker/beam steerer can be used for target Designation, Range Finding or Active Imaging. There is considerable similarity of the dual-band and out-of-band configurations. A dual band video camera is configured to passively acquire video images of a scene within a FOV within a frame time in first and second spectral bands, with the second spectral band being the same spectral band as the LADAR detector (or physically the same detector). Band 1 and Band 2 readout integrated circuits (ROICs) process the first and second spectral bands, respectively. The ROICs are typically implemented as an integral part of dual band video camera. Operating in the same band provides the advantages presented for the in-band configuration plus others. The images generated in the first spectral band by the Band 1 ROIC are unaffected by the reflected laser energy. In a first mode of operation, the second spectral band (Band 2 ROIC) is used only to provide closed-loop steering control. In this case, band 2 ROIC does not have to blank the images. In a second mode, the second spectral band (Band 2 ROIC) is used to provide closed-loop steering control and dual-band tracking. In this case, band 2 ROIC does have to identify those images containing reflected laser energy. Designation and AI/RF are performed at different wavelengths. AI is performed with a CW or high-PRF laser whereas RF is performed with a low PRF laser. The return signals off of the multiple targets are discriminated by wavelength and/or PRF.

The target tracker/beam steerer 600 utilizes the capabilities of a Micro-Electro-Mechanical System (MEMS) Micro-Mirror Array (MMA) 610 comprising a plurality of independently and continuously controllable mirrors 613 as shown in FIG. 3*b*. Each mirror 613 is capable of "Tip" (rotation about an X-axis), "Tilt" (rotation about a Y-axis) and "Piston" (translation along a Z-axis, perpendicular to the XY plane) where the X, Y and Z are orthogonal axes in a three-dimensional space. The independently controllable mirrors can be adaptively segmented to change the number of output laser beams and the size/power of a given beam. The "Tip" and "Tilt" capabilities are used to perform beam steering. The MMA is preferably capable of steering an output laser beam over a steering range of at least −10°×+10° in tip and tilt at a steering rate of at least 1 KHz (<1 millisecond). The Piston function is useful to perform wavefront correction for a given output beam when a segment includes multiple mirrors that "oversample" the input beam. The MMA is preferably capable of translating the mirror plus or minus 10 microns. As such, the "Piston" capability is not strictly required unless wavefront correction is implemented. As time between frames increases (time gets further from the last frame and closer to the next frame), the uncertainty in target position and angle-to-target grows. The piston function can be used to slightly defocus the beam as the uncertainty grows to ensure illumination of the target. When the next frame occurs, the uncertainty resets and grows until the next frame. Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. This MEMS MMA is currently being commercialized by Bright Silicon technologies for "digitally controlling light."

The MEMS MMA provides several advantages for use as a beam steerer in a multi-target tracking system. The MMA can be segmented to simultaneously generate and steer multiple output beams to simultaneously illuminate multiple tracked targets. The MMA can be adaptively segmented to change the number of output beams, and power of a given output beam, based on the target list, range to target, threat level etc. The MMA can be coated with different AR coatings to implement different single-wavelength or multi-spectral beams. Of particular import, these different wavelengths can be implemented without any changes to the underlying MEMS MMA itself or the command signals to actuate the mirrors, only the AR coatings and/or the spectral content of the input laser beam need be modified. The MMA can be adaptively configured to simultaneously perform one or more Designation, Range Finding and Active Imaging modes on the same or different tracked targets. The Tip-Tilt-Piston MMA can be segmented so that each segment includes a plurality of mirrors to "oversample" the input beam. The mirrors in a given segment may be controlled to provide wavefront correction to the corresponding output beam.

The target tracker/beam steer is used to simultaneously illuminate multiple tracked targets for one or more modes of operation selected from Designation, Range Finding, Active Imaging and perhaps Multi-Spectral Active Imaging. Designation and AI/RF are performed at different wavelengths. The MEMS MMA allows for two or more modes of operation to be performed on the same or different tracked targets. In a typical embodiment, the Designation source provides a pulsed laser beam at a wavelength in 0.8 to 1.1 microns range, for example with a pulse repetition rate (PRF) in which a defined pattern of pulses form a designation code. A $3^{rd}$ party detects the return of the target to prosecute the target. The Range Finder source provides a low PRF (e.g. 100 Hz) pulsed laser beam at a wavelength in 1.2 to 1.3 microns. The detector is configured to sense reflected high peak power laser energy over at least the entire cue-box, which is processed to produce a range estimate for each of the illuminated targets. The Active Imaging source provides a high PRF (e.g. 5 kHz) pulsed or CW laser beam at a wavelength in 1.4 to 1.7 microns. The video camera senses high average power reflected laser energy to generate an active image of the illuminated targets. In some cases a common source may be used for RF and AI operating in a band from 1.3 to 1.5 microns, or similar. The PRF can be controlled from low to high depending on the mode of operation. An optional Multi-Spectral Active Imaging source provides a high PRF pulsed or CW multi-spectral beam that spans a broader band such as 1.2 to 1.7 microns. Designation and AI/RF are performed at different wavelengths. AI is performed with a CW or high-PRF laser whereas RF is performed with a low PRF laser. The return signals off of the multiple targets are discriminated by wavelength and PRF.

Figure 4:
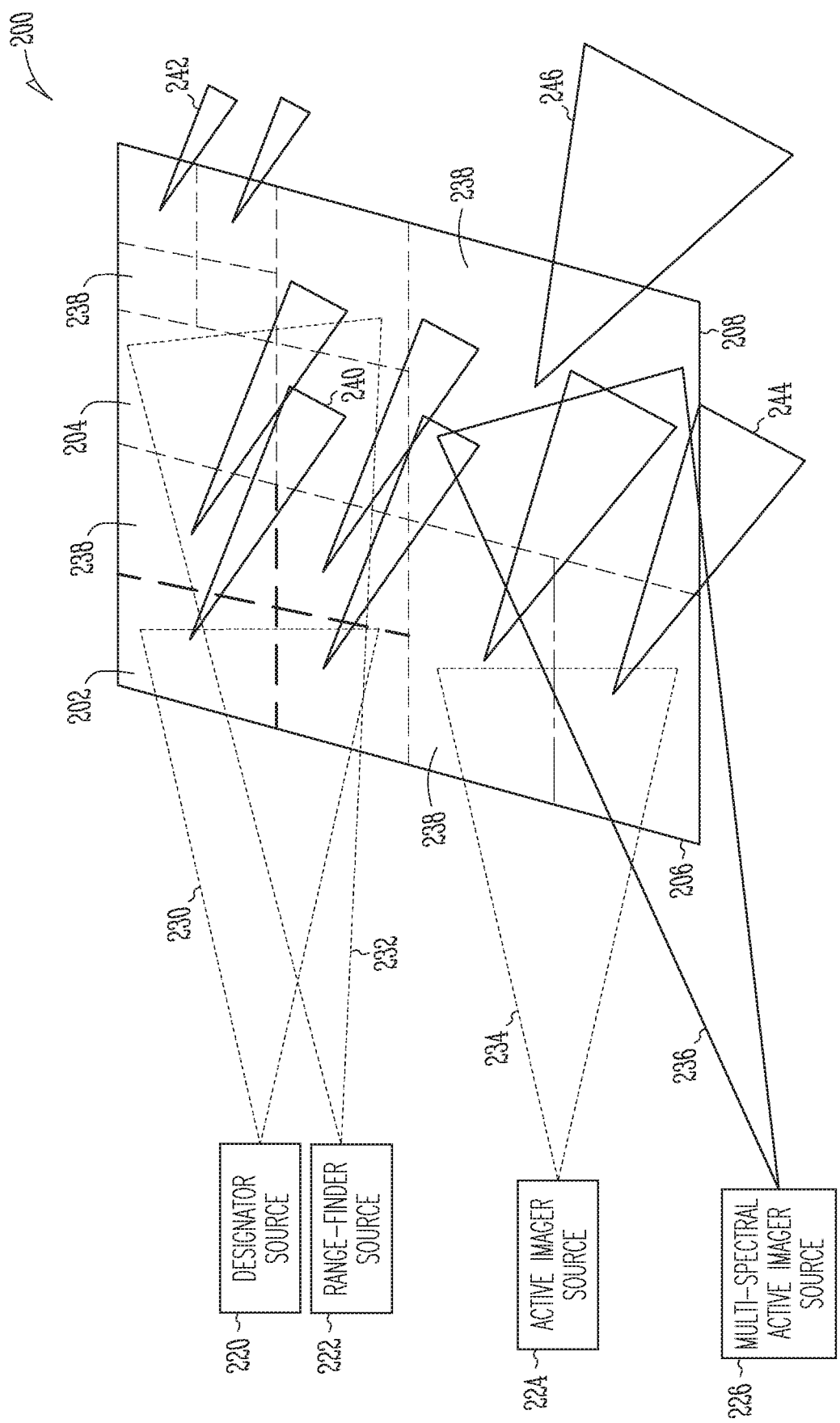
FIG. 4 is a diagram of an embodiment of the multiple target tracker and beam steerer in which Designator, Range-Finder, Active Imager and Multi-Spectral Active imager sources illuminate different sections of a MEMS MMA that partitions each section into multiple segments to generate and independently steer multiple output beams to simultaneously prosecute multiple targets with different operational modes.
Figure 5:
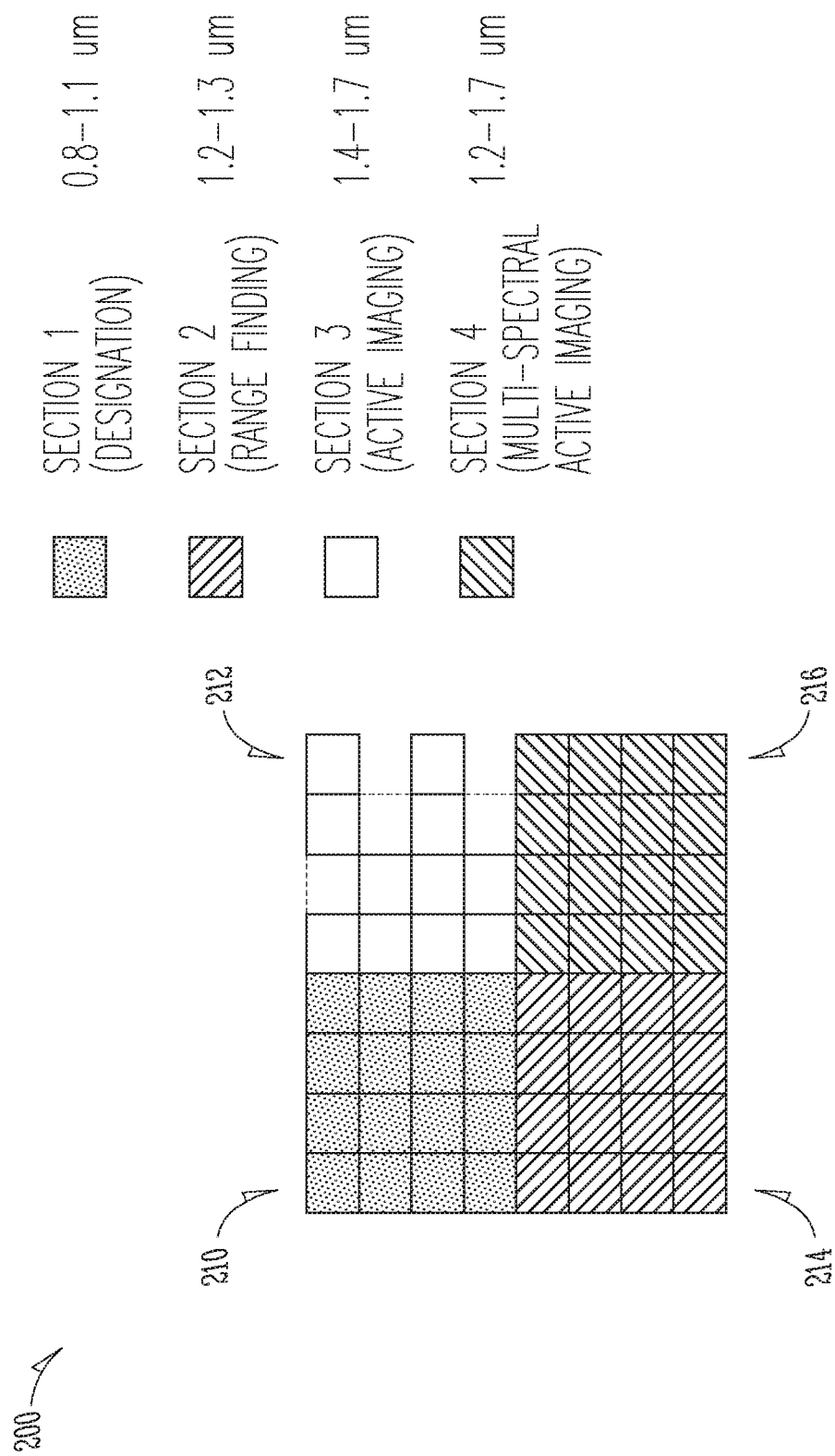
FIG. 5 is a diagram of the reflective coatings formed on the mirrors in the different sections of the embodiment in FIG. 4 to enhance the different modes of operation.

Referring now to FIGS. 4 and 5, in an embodiment for multi-mode operation, the MEMS MMA 200 is partitioned into at least three sections 202, 204 and 206, one each for Designation, Range Finding and Active Imaging and optionally a fourth section 208 for Multi-Spectral Active Imaging. The sections do not need to be equally sized and can be any portion of the array based on the number of targets supported for each mode. The mirrors in each section are provided with reflective coatings 210, 212, 214 and 216 at the corresponding center wavelength. Designator, Range Finder, Active Imager and Multi-Spectral Active Imager sources 220, 222, 224 and 226 illuminate sections 202, 204, 206 and 208, respectively, with input laser beams 230, 232, 234 and 236 (CW or pulsed as appropriate) when selected. In response to command signals, the MEMS MMA 200 partitions each section in accordance with the target list to generate output laser beams 240, 242, 244 and 246 for the corresponding input source and mode of operation. Taken together, the MEMS MMA simultaneously prosecutes multiple tracked targets using one or multiple modes of operation. In this particular example, the Designation section 202 is partitioned into 4 segments 238 to generate and independently steer 4 output laser beams 240 at, for example, 1.1 microns. The Range Finding section 204 is partitioned into 7 segments 238 to generate and independently steer 7 output laser beams 242 at, for example, 1.3 microns. The Active Imaging section 206 is partitioned into 2 segments 238 to generate and independently steer 2 output laser beams 244 at, for example, 1.5 microns. Optionally, the Multi-Spectral Active Imaging section 208 is partitioned into a single segment 238 to generate and steer 1 output laser beam 246.

Figure 6:
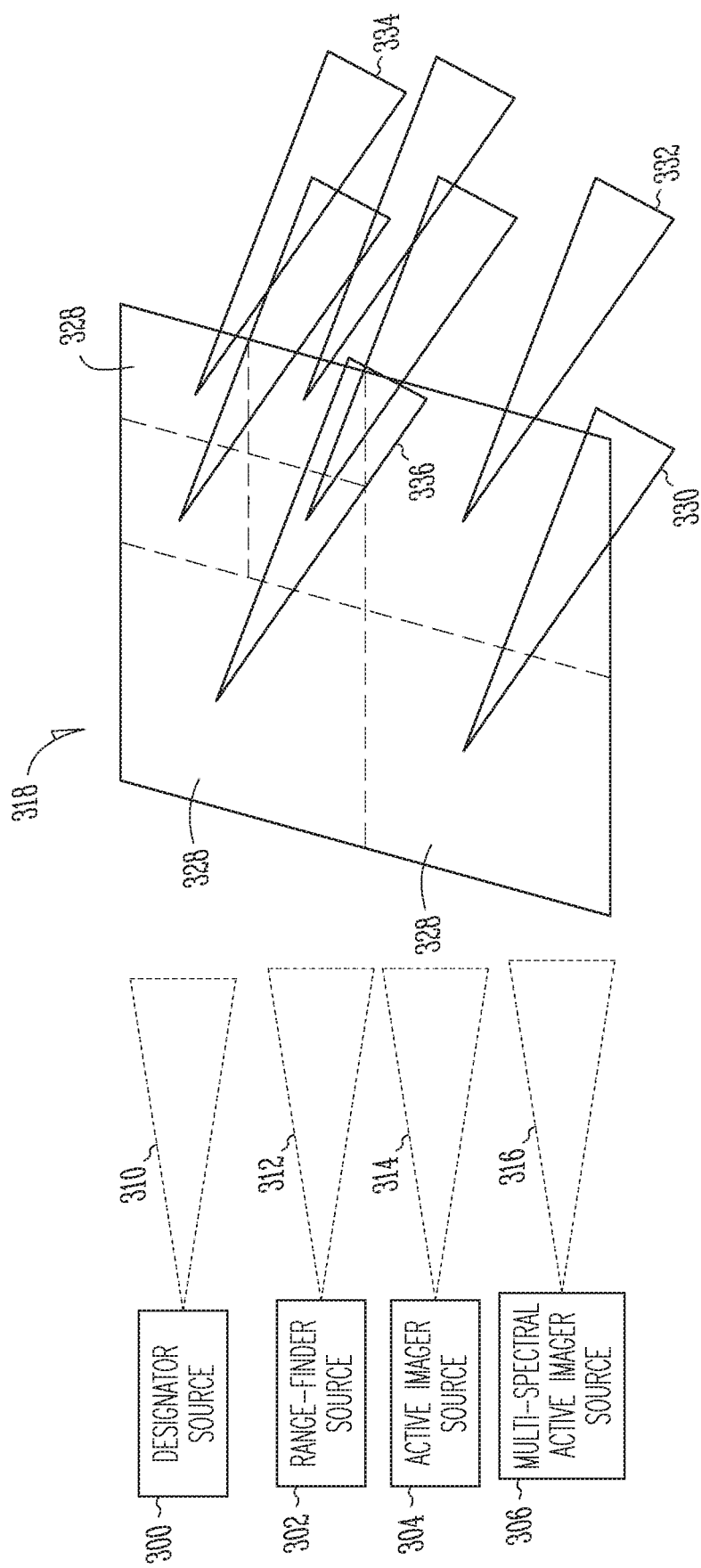
FIG. 6 is a diagram of an embodiment of the multiple target tracker and beam steerer in which Designator, Range-Finder, Active Imager and Multi-Spectral Active imager sources illuminate the entire MEMS MMA that partitions itself into multiple segments to generate and independently steer multiple output beams to simultaneously prosecute multiple targets with different operational modes.
Figure 7:
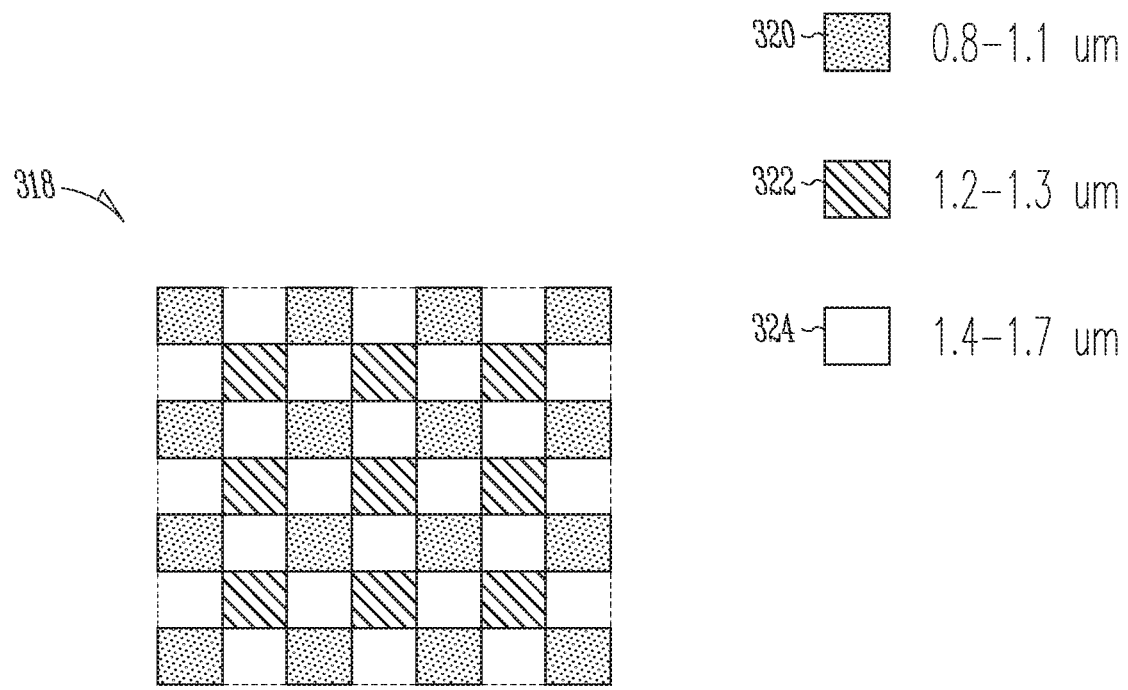
FIG. 7 is a diagram of the reflective coatings formed on the mirrors in the different sections of the embodiment in FIG. 6 to enhance the different modes of operation.
Figure 8A:
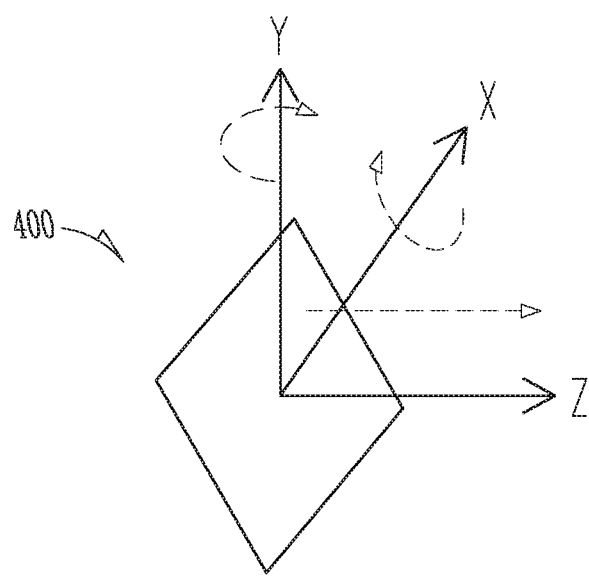
FIGS. 8A through 8E illustrate a mirror with tip/tilt/piston actuation and different tip, tilt and piston actuations of multiple mirrors within a given segment and across segments to steer or wavefront correct an output optical beam.
Figures 8B, 8C, 8D, 8E:
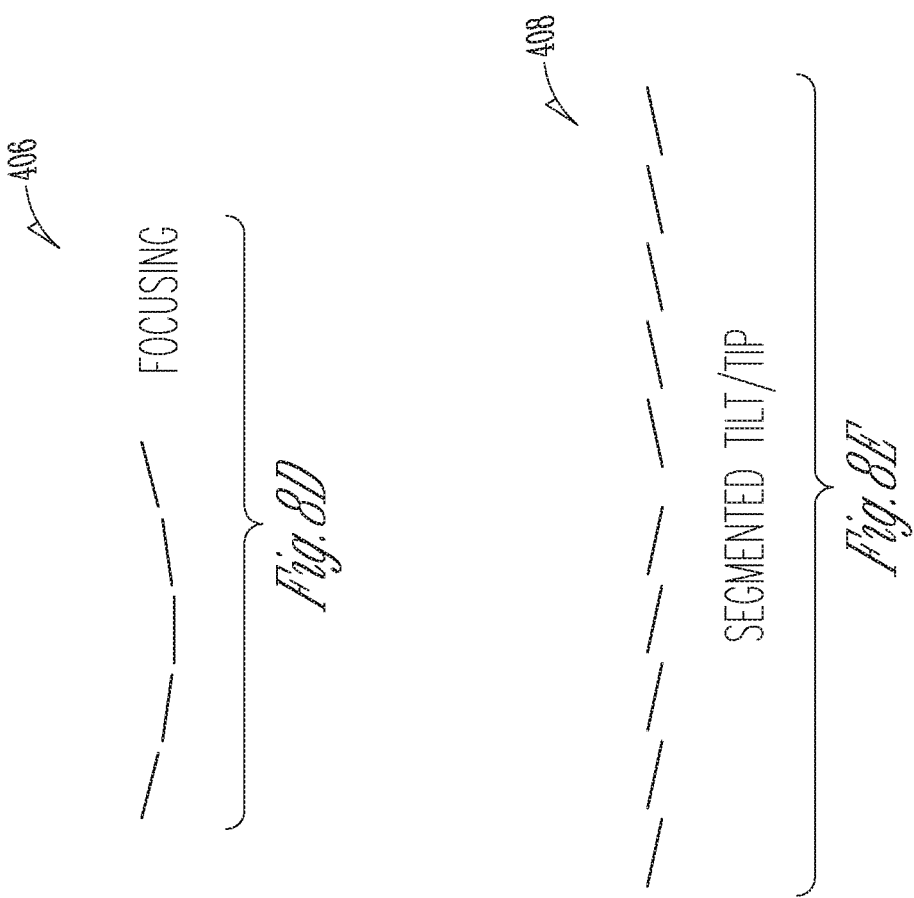

Referring now to FIGS. 6 and 7, in an embodiment Designator, Range Finder, Active Imager and Multi-Spectral Active Imager sources 300, 302, 304 and 306 generate input laser beams 310, 312, 314 and 316, respectively, (CW or pulsed as appropriate) when selected to illuminate an entire MEMS MMA 318. The mirrors are provided with reflective coatings 320, 322, and 324 at the corresponding center wavelengths of the various input sources in, for example, a "checkerboard" type pattern. Multi-Spectral Active Imager source 306 illuminates an entire segment. The broadband beam reflects off of the different wavelength reflective coatings 320, 322, and 324 to produce the multi-spectral beam. In response to command signals, the MEMS MMA 318 partitions itself in accordance with the target list and specified operational modes into multiple segments 328 to generate output laser beams 330, 332, 334 and 346 for the corresponding input source and mode of operation. If all of the mirrors in a given segment were controlled to steer the beam to the angle-to-target, the output beam could simultaneously perform all four operational modes on the illuminated target. Typically this is not the case. A subset of the four possible modes, typically a single mode may be specified for a given target on the target list at a given time. If Designation is not selected, the mirrors within a given segment corresponding to designation should be steered to avert the output laser beam component so it does not illuminate the target or the designation may be turned off. Targets not on the target list should not be designated. The output laser beam components for other unselected modes may or may not illuminate the target. The returns although unneeded at that time may complicate processing of the desired returned signals.

Referring now to FIGS. 8A-8E, an exemplary mirror 400 is responsive to command signals to tip and tilt each mirror about X and Y orthogonal axes, respectively, and to translate each mirror in the Z orthogonal to the XY plane containing. The mirrors in a given segment may be tilted/tipped 402 all in the same direction to steer an output beam. The piston function providing for translation of the mirror in the Z axis may be used to perform wavefront correction 404 across the output laser beam. In Active Imaging mode, the wavefront may be corrected for atmospheric distortion e.g. Adaptive Optics (AO) Piston. The tip/tilt and piston functions may be used to provide focusing 406 of the output laser beam. The wavefront correction or focusing may be superimposed on top of the tilt/tip that steers the output laser beam. The mirrors in different segments may have different tilt/tip 408 to independently steer the output laser beams or any combination of tip/tilt, piston and focusing.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A multiple target tracker and laser beam steerer, comprising:
   a video camera configured to acquire video images of a scene within a field-of-view (FOV) within a frame time;
   a video tracker configured to process the video images within at least a cue-box within the FOV and output a list of multiple tracked targets and corresponding angles-to-targets within the frame time;
   a Micro-Electro-Mechanical System (MEMS) Micro-Mirror Array (MMA) comprising a plurality of independently and continuously controllable mirrors responsive to command signals to tip and tilt each mirror about first and second orthogonal axes, respectively, and to translate in a third axis orthogonal to the plane containing the first and second orthogonal axes;
   a laser system configured to transmit one or more input laser beams to illuminate the MEMS MMA; and
   one or more processors configured to process the list of tracked targets and corresponding angles-to-targets and generate command signals to partition the MEMS MMA into a plurality of segments, each segment including a plurality of contiguous mirrors responsive to command signals to form and steer a single output laser beam to the corresponding angle-to-target to simultaneously illuminate multiple tracked targets per frame over at least the entire cue-box,
   said one or more processors configured to generate command signals to translate the plurality of mirrors in each segment along the third axis by different amounts to slightly and increasingly defocus the output laser beam as an uncertainty in a target position and the angle-to-target grows within the frame time for each frame.

2. The multiple target tracker and laser beam steerer of claim 1, wherein the MEMS MMA is capable of steering each output laser beam over a steering range of at least −10° x+10° in tip and at least −10° x+10° tilt at a steering rate of at least 1 KHz.

3. The multiple target tracker and laser beam steerer of claim 1, wherein said one or more processors are configured to generate command signals to adaptively partition the MEMS MMA to change the number of segments and corresponding number of output laser beams for a fixed subset of mirrors in which all mirrors are illuminated and each segment includes a plurality of contiguous mirrors.

4. The multiple target tracker and laser beam steerer of claim 1, wherein said one or more processors are configured to generate command signals to adaptively partition the MEMS MMA to combine or split segments and combine or split output laser beams at the MEMS MMA to vary the power level of a given single output laser beam.

5. The multiple target tracker and laser beam steerer of claim 1, wherein at least some of the plurality of output laser beams are at different wavelengths.

6. The multiple target tracker and laser beam steerer of claim 1, wherein the plurality of mirrors in at least one segment comprise reflective coatings at different wavelengths $\lambda_1, \lambda_2, \ldots \lambda_N$.

7. The multiple target tracker and laser beam steerer of claim 1, wherein said one or more processors generate command signals for the plurality of mirrors in a given segment to translate the plurality of mirrors along the third axis by differing amounts across the given segment to reduce edge effects between the plurality of mirrors to form the output laser beam.

8. The multiple target tracker and laser beam steerer of claim 1, wherein the laser system comprises a Designator source at a first wavelength $\lambda_1$, a Range Finder source at a second wavelength $\lambda_2$ and an Active Imaging source at a third wavelength $\lambda_3$ configured to illuminate the MEMS MMA, wherein $\lambda_1$ is different than $\lambda_2$ and $\lambda_3$, wherein the one or more processors are configured to control the plurality of output laser beams so that a combination of two or more modes selected from Designation, Range Finding and Active Imaging are simultaneously performed on the same or different tracked targets.

9. The multiple target tracker and laser beam steerer of claim 8, wherein the Range Finder source and Active Imaging source are a common source where $\lambda_2=\lambda_3$.

10. The multiple target tracker and laser beam steerer of claim 8, wherein the Designator, Range Finder and Active Imaging sources each illuminate the entire MEMS MMA, wherein said one or more processors generate command signals to partition the MEMS MMA into a plurality of segments and to simultaneously steer a plurality of output beams such that two or more modes are simultaneously performed on the same or different tracked targets.

11. The multiple target tracker and laser beam steerer of claim 8,
   wherein the Designation source provides a pulsed laser beam with a pulse repetition rate (PRF) in which a defined pattern of pulses form a designation code;
   wherein the Range Finder source provides a low PRF pulsed laser beam, further comprising a detector configured to sense reflected high peak power laser energy over at least the entire cue-box, wherein the one or more processors process the sensed reflected laser energy to produce a range estimate for each of the illuminated targets; and
   wherein the Active Imaging source provides a high PRF pulsed or CW laser beam, wherein the video camera senses high average power reflected laser energy to generate an active image of the illuminated targets.

12. The multiple target tracker and laser beam steerer of claim 8, wherein the MEMS MMA is partitioned into at least three sections, wherein said Designator source illuminates a plurality of mirrors in a first section, the Range Finder source illuminates a plurality of mirrors in a second section, and the Active Imaging source illuminates a plurality of mirrors in a third section, wherein said one or more processors generate command signals to partition each selected section into one or more segments, each including a plurality of mirrors, to simultaneously steer a plurality of output laser beams such that two or more modes are simultaneously performed on the same or different tracked targets.

13. The multiple target tracker and laser beam steerer of claim 12, wherein the plurality of mirrors in the first section have a reflective coating at the first wavelength $\lambda_1$, the plurality of mirrors in the second section have a reflective coating at the second wavelength $\lambda_2$ and the plurality of mirrors in the third section have a reflective coating at the third wavelength $\lambda_3$.

14. A multiple target tracker and laser beam steerer, comprising:
a video camera configured to acquire video images of a scene within a field-of-view (FOV) within a frame time;
a video tracker configured to process the video images within at least a cue-box within the FOV and output a list of multiple tracked targets and corresponding angles-to-targets within the frame time;
a Micro-Electro-Mechanical System (MEMS) Micro-Mirror Array (MMA) comprising a plurality of independently and continuously controllable mirrors responsive to command signals to tip and tilt each mirror about first and second orthogonal axes, respectively, said MEMS MMA partitioned into first, second, third and fourth sections with a plurality of mirrors in each of the first, second, and third sections of the MMA including reflective coatings at discrete wavelengths $\lambda_1$, $\lambda_2$, and $\lambda_3$;
a laser system including a Designator source at a first wavelength $\lambda_1$ that illuminates the plurality of mirrors in the first section, a Range Finder source at a second wavelength $\lambda_2$ that illuminates the plurality of mirrors in the second section, a single-wavelength Active Imaging source at a third wavelength $\lambda_3$ that illuminates the plurality of mirrors in the third section and a multi-spectral Active Imaging source having a bandwidth that spans a plurality of wavelengths $\lambda_4, \ldots \lambda_N$ that illuminates each of the plurality of mirrors in the fourth section, wherein $\lambda_1$ is different than $\lambda_2$ and $\lambda_3$, and
one or more processors configured to process the list of tracked targets and corresponding angles-to-targets and generate command signals to partition each section of the MEMS MMA into one or more segments, each segment including a plurality of contiguous mirrors responsive to command signals to form and steer a single output laser beam to the corresponding angle-to-target to simultaneously illuminate multiple tracked targets per frame over at least the entire cue-box such that two or more modes selected from Designation, Range Finding and Single-Wavelength and Multi-Spectral Active Imaging are simultaneously performed on the same or different tracked targets.

15. The multiple target tracker and laser beam steerer of claim 14, wherein the plurality of mirrors in each of the segments in the fourth section have different reflective coatings at the plurality of wavelengths $\lambda_4, \ldots, \lambda_N$ such that each output laser beam from the fourth section is multi-spectral.

16. A multiple target tracker and laser beam steerer, comprising:
a video camera configured to acquire video images of a scene within a field-of-view (FOV) within a frame time;
a video tracker configured to process the video images within at least a cue-box within the FOV and output a target list of multiple tracked targets and corresponding angles-to-targets within the frame time;
a Micro-Electro-Mechanical System (MEMS) Micro-Mirror Array (MMA) comprising a plurality of independently and continuously controllable mirrors responsive to command signals to tip and tilt each mirror about first and second orthogonal axes, and to translate in a third axis orthogonal to the plane containing the first and second orthogonal axes, wherein a plurality of mirrors in each of a first, a second, and a third section of the MMA include reflection coatings at discrete wavelengths $\lambda_1$, $X_2$, and $\lambda_3$;
a laser system including a Designator source at a first wavelength $\lambda_1$, a Range Finder source at a second wavelength $\lambda_2$ and an Active Imaging source at a third wavelength $\lambda_3$ configured to transmit input laser beams to illuminate the first, second and third sections of the MEMS MMA, respectively, to implement Designating, Range Finding and Active Imaging modes; and
one or more processors configured to process the list of tracked targets and corresponding angles-to-targets and generate command signals to partition each of said selected first, second and third sections of the MEMS MMA into one or more segments, each segment including a plurality of contiguous mirrors responsive to command signals to form and steer a single output laser beam to a corresponding angle-to-target and to translate the plurality of mirrors of each segment along the third axis by different amounts to slightly and increasingly defocus the output laser beam as an uncertainty in a target position and a angle-to-target grows within the frame time for each frame;
wherein the one or more processors are configured to generate command signals to implement each of the following alone or in combination;
simultaneously illuminate multiple tracked targets per frame over at least the entire cue-box;
adaptively segment a given section of the MEMS MMA to vary the number of output laser beams formed by all of the illuminated mirrors in the given section and to vary the power level in each of the output laser beams; or
simultaneously perform a combination of two or more modes selected from Designation, Range Finding and Active Imaging on the same or different tracked targets.

17. The multiple target tracker and laser beam steerer of claim 16, wherein said one or more processors generate command signals for the plurality of mirrors in a given segment to translate the plurality of mirrors along the third axis by differing amounts across the given segment to reduce edge effects between the plurality of mirrors to form the single output laser beam.

18. A multiple target tracker and laser beam steerer, comprising:
a video camera configured to acquire video images of a scene within a field-of-view (FOV) within a frame time;
a video tracker configured to process the video images within at least a cue-box within the FOV and output a list of multiple tracked targets and corresponding angles-to-targets within the frame time;
a Micro-Electro-Mechanical System (MEMS) Micro-Mirror Array (MMA) comprising a plurality of independently and continuously controllable mirrors responsive to command signals to tip and tilt each mirror about first and second orthogonal axes, respectively, and to translate each mirror in a third axis orthogonal to the plane containing the first and second orthogonal axes;
a laser system configured to transmit one or more input laser beams to illuminate the MEMS MMA; and
one or more processors configured to process the list of tracked targets and corresponding angles-to-targets and generate command signals to partition the MEMS MMA into a plurality of segments, each segment comprising a plurality of contiguous mirrors responsive to command signals to translate along the third axis by differing amounts across the segment to reduce edge effects between the plurality of contiguous mirrors to form a single output laser beam and to tip or tilt the plurality of contiguous mirrors to steer the single output laser beam to the corresponding angle-to-target to simultaneously illuminate multiple tracked targets per frame over at least the entire cue-box said one or more processors configured to generate command signals to translate the plurality of mirrors in each segment along the third axis by different amounts to slightly and increasingly defocus the output laser beam as an uncertainty in a target position and the angle-to-target grows within the frame time for each frame.

\* \* \* \* \*

UNITED STATES PATENT AND TRADEMARK OFFICE
CERTIFICATE OF CORRECTION

PATENT NO. : 11,837,840 B2
APPLICATION NO. : 17/009453
DATED : December 5, 2023
INVENTOR(S) : Uyeno et al.

Page 1 of 1

It is certified that error appears in the above-identified patent and that said Letters Patent is hereby corrected as shown below:

On the Title Page

On page 3, in Column 2, under item (56) "Other Publications", Line 10, delete "(Inertial" and insert --Inertial-- therefor In the Claims In Column 14, Line 5, in Claim 16, delete "$X_2$," and insert --$\lambda_2$,-- therefor In Column 14, Line 24, in Claim 16, delete "a" and insert --the-- therefor In Column 15, Line 10, in Claim 18, after "cue-box", insert --,--

Signed and Sealed this
Eleventh Day of February, 2025

Coke Morgan Stewart
*Acting Director of the United States Patent and Trademark Office*